United States Patent
Ishii et al.

(10) Patent No.: US 9,984,717 B2
(45) Date of Patent: May 29, 2018

(54) OPTICAL INFORMATION RECORDING DEVICE AND OPTICAL INFORMATION RECORDING METHOD

(71) Applicant: Hitachi-LG Data Storage, Inc., Tokyo (JP)

(72) Inventors: Toshiki Ishii, Tokyo (JP); Makoto Hosaka, Tokyo (JP)

(73) Assignee: Hitachi-LG Data Storage, Inc., Tokyo (JP)

(*) Notice: Subject to any disclaimer, the term of this patent is extended or adjusted under 35 U.S.C. 154(b) by 0 days. days.

(21) Appl. No.: 15/397,773

(22) Filed: Jan. 4, 2017

(65) Prior Publication Data
US 2017/0200463 A1   Jul. 13, 2017

(30) Foreign Application Priority Data
Jan. 12, 2016 (JP) .................. 2016-003547

(51) Int. Cl.
| | |
|---|---|
| *G11B 7/0065* | (2006.01) |
| *G03H 1/26* | (2006.01) |
| *G11B 7/08* | (2006.01) |
| *G11B 7/1395* | (2012.01) |
| *G11B 7/09* | (2006.01) |
| G11B 7/1369 | (2012.01) |
| G11B 7/0037 | (2006.01) |
| G11B 7/007 | (2006.01) |
| G11B 7/00 | (2006.01) |

(52) U.S. Cl.
CPC .......... *G11B 7/0065* (2013.01); *G03H 1/265* (2013.01); *G11B 7/083* (2013.01); *G11B 7/09* (2013.01); *G11B 7/1395* (2013.01); *G03H 2001/2675* (2013.01); *G11B 7/0037* (2013.01); *G11B 7/00772* (2013.01); *G11B 7/1369* (2013.01); *G11B 2007/0009* (2013.01)

(58) Field of Classification Search
None
See application file for complete search history.

(56) References Cited

U.S. PATENT DOCUMENTS

| | | | |
|---|---|---|---|
| 2004/0179251 A1 | 9/2004 | Anderson et al. | |
| 2010/0060960 A1* | 3/2010 | Tanaka ................ | G03H 1/22 359/11 |

FOREIGN PATENT DOCUMENTS

| | | |
|---|---|---|
| JP | 2004-272268 A | 9/2004 |
| JP | 2013-114716 A | 6/2013 |

* cited by examiner

*Primary Examiner* — Brian Butcher
(74) *Attorney, Agent, or Firm* — Mattingly & Malur, PC

(57) ABSTRACT

The optical information recording device includes a light source configured to emit a laser beam, an optical element configured to divide the laser beam into the reference beam and the signal beam, an angle control unit configured to control an angle of incidence of the reference beam on the optical information recording medium, and a phase control unit configured to control a phase of at least one of the signal beam and the reference beam in a recording period, wherein the angle control unit controls an angle interval so that a position of a 1st null of an adjacent page of the signal beam is fixed, and wherein the phase control unit controls the phase of the signal beam or the reference beam so that a phase difference between the adjacent pages is a predetermined value.

15 Claims, 15 Drawing Sheets

OPTICAL INFORMATION RECORDING DEVICE AND OPTICAL INFORMATION RECORDING METHOD

CLAIM OF PRIORITY

The present application claims priority from Japanese application serial no. JP 2016-003547, filed on Jan. 12, 2016, the content of which is hereby incorporated by reference into this application.

TECHNICAL FIELD

The present invention relates to a device and method for recording information by using holography.

BACKGROUND ART

At present, in accordance with a Blu-ray disc (registered trademark) standard using a blue-violet semiconductor laser, it is possible to commercialize an optical disc having a recording density of about 100 GB even for consumer use. From now on, even in optical disks, it is desirable to increase the capacity exceeding 500 GB. However, in order to implement such a high density with an optical disk, there is a need of a high densification technology using a new method different from the high densification technology in the related art by shortening the wavelength and increasing the NA of the objective lens.

In research on next generation storage technology, a holographic recording technology for recording digital information using holography has attracted attention. As a hologram recording technology, for example, there is JP 2004-272268 A (Patent Document 1). The document discloses "multiplexing method and device of spatially multiplexing holograms by partially and spatially overlapping adjacent stacks of the holograms. Each stack may further have complete advantages of other multiplexing technologies, for example, angle multiplexing, wavelength multiplexing, phase sign multiplexing, peristropic multiplexing, or fractal-theory multiplexing. An amount equal to a beam waist of a signal beam recording a hologram divides individual stacks of the hologram. In a recovering period, a certain hologram and another hologram adjacent to the certain hologram are simultaneously read. A filter is arranged at the beam waist of the recovered data, so that the read adjacent hologram is not transferred to a camera plane. Otherwise, a recovering other than the desired recovering can be filtered by an angle filter on a middle plane in an optical system having a limited angle pass band."

In addition, as a technique of performing multiplex-recording by controlling a phase of a signal beam in a recording period, for example, there is JP 2013-114716 A (Patent Document 2). The document discloses "at least two recording light sources 105 and 106 as semiconductor lasers and objective lenses 119 and 121 which condense a light flux from each of the recording light sources on an optical information recording medium 120 are provided, each recording light source outputs an intensity-modulated light flux, and when a recovering light flux is condensed on the optical information recording medium, recording is performed on the optical information recording medium in such a relationship that the light flux of each recording light source and the light flux of the recovering generate reflected beams having different phase differences which are different by almost 90 deg. Accordingly, an arbitrary complex amplitude of the light is recorded without using a phase modulator."

CITATION LIST

Patent Document

Patent Document 1: JP 2004-272268 A
Patent Document 2: JP 2013-114716 A

SUMMARY OF THE INVENTION

Problems to be Solved by the Invention

In the optical information recording/recovering device using holography, in the case of increasing the recording density by reducing the angle or the space distance as parameters which are to be controlled in the multiplexing, a crosstalk component with respect to a signal recovered from the vicinity in terms of angle or space, and thus, the quality of the recovered signal is greatly deteriorated, so that there is a problem in that the crosstalk needs to be reduced.

In consideration of the above-described problems, the present invention is to provide optical information recording device and method capable of obtaining a high recording density and a good quality.

Solutions to Problems

The present invention includes a plurality of means for solving the above-described problems.

According to an aspect of the present invention, there is provided an optical information recording device which multiplex-records a hologram corresponding to an angle of incidence of a reference beam as a page on an optical information recording medium at the time of recording an interference pattern of a signal beam and the reference beam as the hologram on the optical information recording medium. The optical information recording device includes a light source configured to emit a laser beam, an optical element configured to divide the laser beam into the reference beam and the signal beam, an angle control unit configured to control the angle of incidence of the reference beam on the optical information recording medium in the recording period, and a phase control unit configured to control a phase of at least one of the signal beam and the reference beam in the recording period. The angle control unit controls the angle of incidence so that a change of a position of a 1st null of a recovered signal from an adjacent page with respect to the page where the signal beam is to be recorded is suppressed, and the phase control unit controls the phase of at least one of the signal beam and the reference beam so that a phase difference between the adjacent pages is a predetermined value.

According to another aspect of the present invention, there is provided an optical information recording device which multiplex-records a hologram corresponding to an angle of incidence of a reference beam as a page on an optical information recording medium at the time of multiplex-recording an interference pattern of a signal beam and the reference beam as the hologram on the optical information recording medium. The optical information recording device includes a light source configured to emit a laser beam, an optical element configured to divide the laser beam into the reference beam and the signal beam, an angle control unit configured to control the angle of incidence of the reference beam on the optical information recording medium in the recording period, and a phase control unit configured to control a phase of at least one of the signal beam and the reference beam in the recording period. The angle control unit controls the angle of incidence so that a position of a 1st null of a recovered signal from an adjacent page with respect to the page where the signal beam is to be recorded is outside a range of the page where the signal beam is to be recorded, and the phase control unit controls the phase of at least one of the signal beam and the reference beam so that a phase difference between the adjacent pages is a predetermined value.

According to still another aspect of the present invention, there is provided an optical information recording method of recording an interference pattern of a signal beam and a reference beam as a hologram on an optical information recording medium, at the time of recording a plurality of pages in an angular multiplexing scheme, including: controlling an angle interval between the pages so that, with respect to each of the pages, a change of a position of a 1st null of crosstalk from an adjacent page is decreased, and controlling a phase of at least one of the signal beam and the reference beam so that a phase difference between the adjacent pages is a predetermined value.

Effects of the Invention

According to the present invention, is possible to provide optical information recording device and method capable of performing recovering at a good quality even in the case of performing recording with a highly increased recording density in the optical information recording device using holography.

MODE FOR CARRYING OUT THE INVENTION

Figure 1:
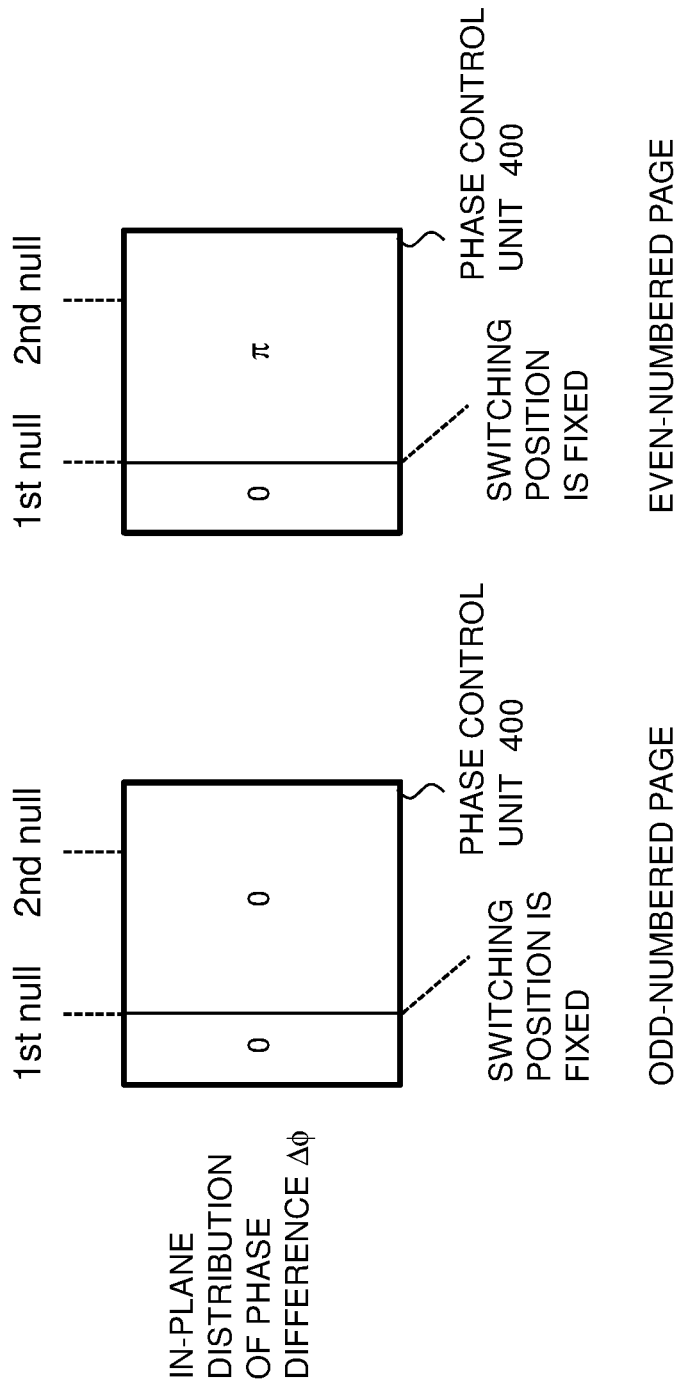
FIG. 1 is a principle diagram illustrating an example where different phase differences are allocated to regions of a signal beam.

Embodiments will be described in detail with reference to the drawings. However, the present invention is not interpreted to be limited to the disclosure of the embodiments described hereinafter. It is easily understood by the skilled in the art that specific configurations can be changed within the scope of the invention without departing from the spirit of the invention.

In the configurations of the invention described hereinafter, the same components or components having the same functions are denoted by the same reference numerals which are commonly used among different figures, and thus, redundant description thereof is omitted.

In the specification and the like, notations "first", "second", "third", and the like are designated in order to identifying components but do not necessarily limit the number of components or the order of components. In addition, a reference numeral for identifying a component is used for each context, and thus, a reference numeral used in one context does not necessarily denote the same component in other contexts. In addition, a component identified by a reference numeral does not preclude combining a function of another components identified by a different reference numeral.

In some cases, for the better understanding of the invention, the position, size, shape, range, and the like of each component illustrated in the drawings may not be illustrated as actual position, size, shape, range, and the like. For this reason, the present invention is not necessarily limited to positions, sizes, shapes, ranges, and the like illustrated in the drawings.

First Embodiment

A first embodiment of the present invention will be described. Although the present invention may be embodied as an optical information recording device, in order to describe the effect of the recovering period, the present invent is described as an optical information recording/recovering device.

Figure 2:
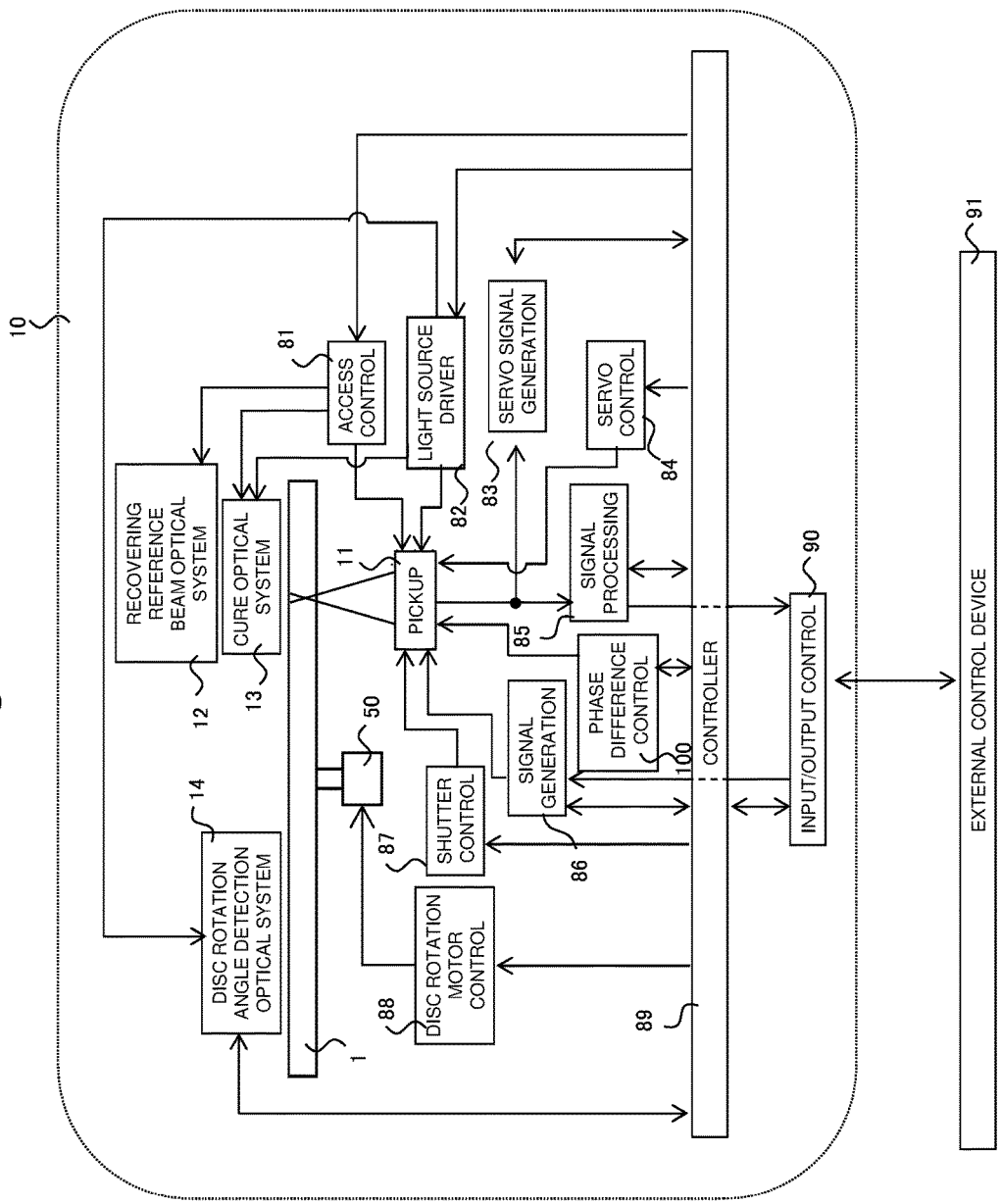
FIG. 2 is a schematic block diagram illustrating a configuration of an optical information recording/recovering device.

FIG. 2 is a block diagram illustrating a recording/recovering device for an optical information recording medium which records and/or recovers digital information by using holography.

An optical information recording/recovering device 10 is connected to an external control device 91 through an input/output control circuit 90. In the case of recording, the optical information recording/recovering device 10 receives a to-be-recorded information signal through the input/output control circuit 90 from the external control device 91. In the case of recovering, the optical information recording/recovering device 10 transmits a to-be-recovered information signal through the input/output control circuit 90 to the external control device 91.

The optical information recording/recovering device 10 is configured to include a pickup 11, a recovering reference beam optical system 12, a cure optical system 13, a disc rotation angle detection optical system 14, and a rotation motor 50. The optical information recording medium 1 is configured so as to be rotatable by the rotation motor 50.

The pickup 11 performs a function of emitting a reference beam and a signal beam to an optical information recording medium 1 to record digital information on the optical information recording medium 1 by using holography. At this time, by a controller 89, a to-be-recorded signal is transferred through a signal generation circuit 86 which modulates information signal to page data to a spatial light modulator in the pickup 11, and the signal beam is modulated by the spatial light modulator.

In the case of recovering the information recorded on the optical information recording medium 1, light wave which is to be incident on the optical information recording medium 1 is generated by the recovering reference beam optical system 12 in the direction reverse to the direction of the recording period of the reference beam emitted from the pickup 11. The recovered beam which is received according to the recovering reference beam is detected by a photo detector in the pickup 11, so that signal is recovered by the signal processing circuit 85.

An exposure time when the optical information recording medium 1 is exposed to the reference beam and the signal beam can be adjusted by the controller 89 controlling an opening/closing time of a shutter in the pickup 11 through a shutter control circuit 87.

The cure optical system 13 performs a function of generating light beam used for pre-cure and post-cure of the optical information recording medium 1. The pre-cure is a pre-process where, in the case of recording information at a desired position in the optical information recording medium 1, the desired position is allowed to be exposed to predetermined light beam in advance before the desired position is allowed to be exposed to the reference beam and the signal beam. The post-cure is a post-process where, after the information is recorded at the desired position in the optical information recording medium 1, the desired position is exposed to predetermined light beam in order to make impossible to additionally write at the desired position.

The disc rotation angle detection optical system 14 is used to detect a rotation angle of the disc-shaped optical information recording medium 1. In the case of adjusting the optical information recording medium 1 at a predetermined rotation angle, a signal corresponding to the rotation angle is detected by the disc rotation angle detection optical system 14, and the rotation angle of the optical information recording medium 1 can be controlled by the controller 89 using the detected signal through a disc rotation motor control circuit 88.

A predetermined light source driving current is supplied from a light source driver circuit 82 to light sources in the pickup 11, the cure optical system 13, and the disc rotation angle detection optical system 14. Each light source can emit light beam with a predetermined light amount.

In addition, the pickup 11 and the disc cure optical system 13 are provided with mechanisms which can slide the positions thereof in the radial direction of the optical information recording medium 1, so that position controlling is performed through an access control circuit 81.

In a recording technology using angular multiplexing of holography, a tolerance with respect to a deviation of the reference beam angle tends to be extremely small.

Therefore, in the pickup 11, a mechanism of detecting an amount of deviation of the reference beam angle needs to be provided, a servo control signal needs to be generated by a servo signal generation circuit 83, and a servo mechanism for correcting the amount of deviation through a servo control circuit 84 needs to be provided in the optical information recording/recovering device 10.

In addition, configurations of some optical systems or configurations of all the optical systems of the pickup 11, the cure optical system 13, and the disc rotation angle detection optical system 14 may be combined into one system so as to be simplified.

A phase difference control circuit 100 is a circuit for controlling a relative phase difference between the signal beam and the reference beam in the recording period so that a phase difference between adjacent or neighboring signals in the recording period becomes substantially $\pi$. The phase difference control circuit receives a command from the controller to control a phase control element in the pickup 11. The phase control element is an element of changing a phase of light. For example, the phase control element may be made of a medium such as glass having a refractive index different from that of air to generate a phase difference. For example, the phase control element may be configured to shift a position in a focus direction by using an actuator-attached mirror to generate a phase difference. In addition, as the phase control element, a phase modulation element using a liquid crystal as represented by a LCOS (Liquid Crystal On Silicon) may be employed. In addition, the phase control element may be an element which is provided with a uniform single phase difference in plane without a plurality of pixels. In addition, since the phase control element intends to allow the phase difference between the signals in the recording period to be substantially $\pi$ as described above, the phase control element is an element having a purpose different from that of a phase mask described below. By organizing the phase control element and the phase mask, a single element having all the effects of the above two elements may be employed.

Figure 3:
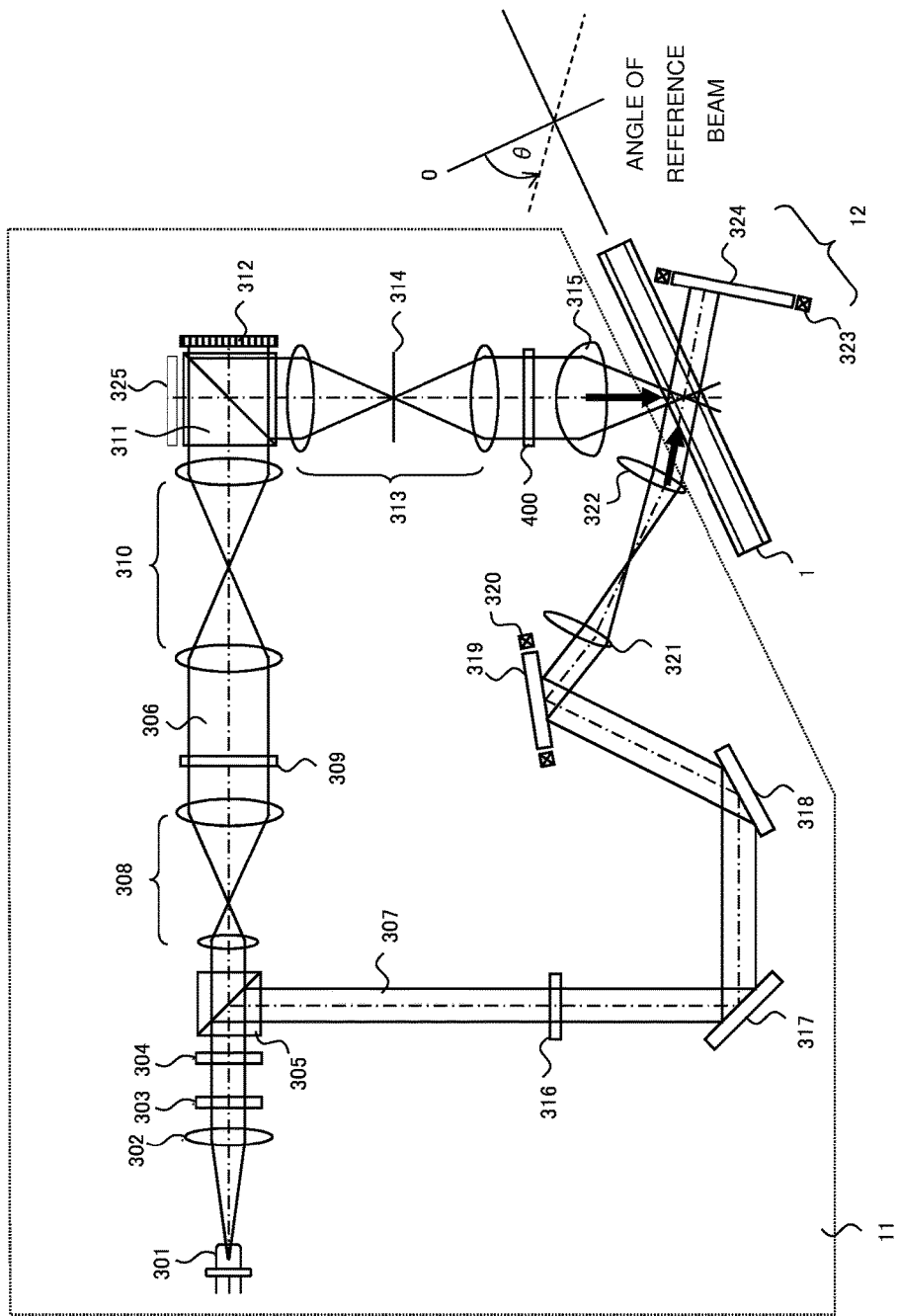
FIG. 3 is a schematic block diagram illustrating an embodiment of a pickup in the optical information recording/recovering device.

FIG. 3 is a diagram illustrating a recording principle in an example of a basic optical system configuration of the pickup 11 in the optical information recording/recovering device 10 according to the embodiment. Light beam emitted from a light source 301 passes through a collimation lens 302 to be incident on a shutter 303. When the shutter 303 is opened, the light beam passes through the shutter 303, and after that, a polarization direction thereof is controlled by an optical element 304 configured with a ½ wave plate or the like so that a light amount ratio between p-polarized light and s-polarized light becomes a desired ratio. After that, the light beam is incident on a PBS (Polarization Beam Splitter) prism 305.

The light beam which passes through the PBS prism 305 serves as a signal beam 306, and a light beam diameter thereof is expanded by a beam expander 308. After that, the light beam passes through a phase mask 309, a relay lens 310, and a PBS prism 311 to be incident on a spatial light modulator 312. The phase mask is an element capable of reducing local consumption of a recording material in the optical information recording medium by intentionally disturbing a wave front of the signal beam to alleviate concentration of the signal beam in an objective lens. As described above, although the phase mask and the phase control element have different required functions, the effects of the phase mask and the phase control element can be simultaneously achieved by one element.

The signal beam 306 added with page data by the spatial light modulator 312 is reflected on the PBS prism 311 to be propagated through a relay lens 313 and a spatial filter 314. After that, the phase distribution of the signal beam 306 is controlled by the phase control element 400 so that the phase difference between the adjacent signals in the recording period becomes substantially π, and the signal beam is collected on the optical information recording medium 1 by an objective lens 315. In addition, the phase control element 400 may be an element which is provided with a uniform fixed phase in plane. Preferably, the phase control element is an element which is configured with a plurality of pixels and can electrically modulate additional phase of each pixel. This is because it is possible to cope with the case where the required value of the additional phase for having substantially π varies with the position in plane due to the influence of the phase mask, the wave front aberration, or the like. It is preferable that the phase control element 400 is disposed at a position where a 4F image is formed by the relay lens 313 from the spatial light modulator 312. This is because the influence of phase distribution disturbance due to propagation can be reduced in order to form a phase distribution inverted equivalent to a phase distribution added by the phase control element 400 on the photo detector 325 in the recovering period. However, the position where the phase control element 400 is disposed is not limited to the example in FIG. 2, but any place where a desired phase difference in the optical path of the signal beam 306 is added may be employed.

On the other hand, the light beam reflected on the PBS prism 305 serves as the reference beam 307. The light beam is set to have a predetermined polarization direction according to the recording period or the recovering period by a polarization direction changing element 316, and after that, the light beam is incident through a mirror 317 and a mirror 318 on a galvano-mirror 319. Since the angle of the galvano-mirror 319 can be adjusted by an actuator 320, the angle of incidence of the reference beam 307 which passes through a lens 321 and a lens 322 to be incident on the optical information recording medium 1 can be set to a desired angle. In addition, in order to set the angle of incidence of the reference beam 307, instead of the galvano-mirror, an element changing the wave front of the reference beam 307 may be used. In the specification, for example, as illustrated, with respect to the angle of the reference beam 307, the direction vertical to the optical information recording medium 1 is defined as 0 deg, the counterclockwise direction is defined as "+" direction, and the clockwise direction is defined as "−" direction.

As described above, interference pattern is formed in a recording medium by allowing the signal beam and the reference beam to be incident on the optical information recording medium 1 to overlap with each other, and information is recorded by writing the pattern on the recording medium. In addition, since the angle of incidence of the reference beam incident on the optical information recording medium 1 can be changed by the galvano-mirror 319, recording by angular multiplexing can be performed.

Hereinafter, with respect to hologram recorded with the reference beam angle being changed in the same region, a hologram corresponding to one reference beam angle is referred to as a page, and a set of pages which are subject to angular multiplexing in the same region is referred to as a book.

Figure 4:
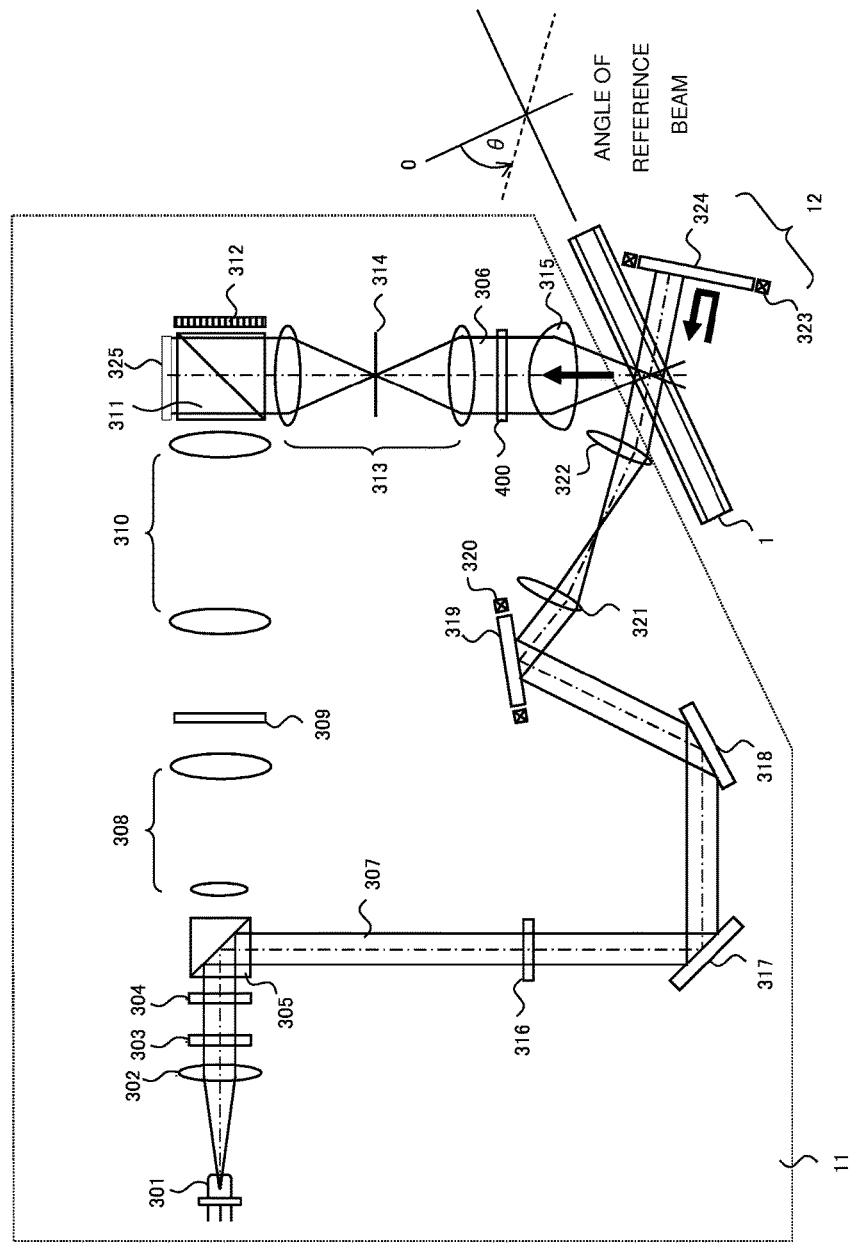
FIG. 4 is a schematic block diagram illustrating an embodiment of a pickup in the optical information recording/recovering device.

FIG. 4 illustrates a recovering principle in an example of a basic optical system configuration of the pickup 11 in the optical information recording/recovering device 10 according to the embodiment. In the case of recovering recorded page data, as described above, the reference beam is incident on the optical information recording medium 1, and the light beam which passes through the optical information recording medium 1 is reflected by the galvano-mirror 324 of which angle can be adjusted by the actuator 323, so that the recovering reference beam is generated.

The recovered beam which is recovered by the recovering reference beam is propagated through the objective lens 315, the phase control element 400, the relay lens 313, and the spatial filter 314. Next, the recovered beam passes through the PBS prism 311 to be incident on the photo detector 325, so that the recorded page data can be recovered. In the recovering period, since there is no need to intentionally designate a phase to the recovered beam, the phase control element 400 allows, for example, a uniform pattern to be displayed, so that a state without phase addition or only DC phase addition occurs. As the photo detector 325, for example, an imaging element such as a CMOS image sensor or a CCD image sensor may be used. However, any element capable of recovering the page data may be used.

Before the influence of the inter-page crosstalk is described, the intensity and phase of the recovered beam will be described. In the case of using angular multiplexing, a recovered beam intensity η, that is, a light amount of a diffracted beam can be expressed by Mathematical Formula 1.

$$\eta \propto \text{sinc}^2\left(\frac{\pi n L}{\lambda} \frac{\sin\theta_{MRS}}{\cos\theta_{MS}} \Delta\theta_{MR}\right) \quad \text{[Mathematical Formula 1]}$$

Herein, n is a refractive index of the optical information recording medium 1, L is a thickness of a recording layer of the optical information recording medium 1, λ is a wavelength of the signal beam 306 and the reference beam 307, $\theta_{MRS}$ is an angle between the signal beam 306 and the reference beam 307, $\theta_{MS}$ is an angle of the signal beam 306 with respect to the normal line of the optical information recording medium 1, and $\Delta\theta_{MR}$ is an angle shift of the reference beam in the recovering period with respect to the reference beam in the recording period. In addition, the angle in Mathematical Formula 1 is an angle in the optical information recording medium 1 and is influenced by the refractive index of the optical information recording medium 1.

Figure 5:
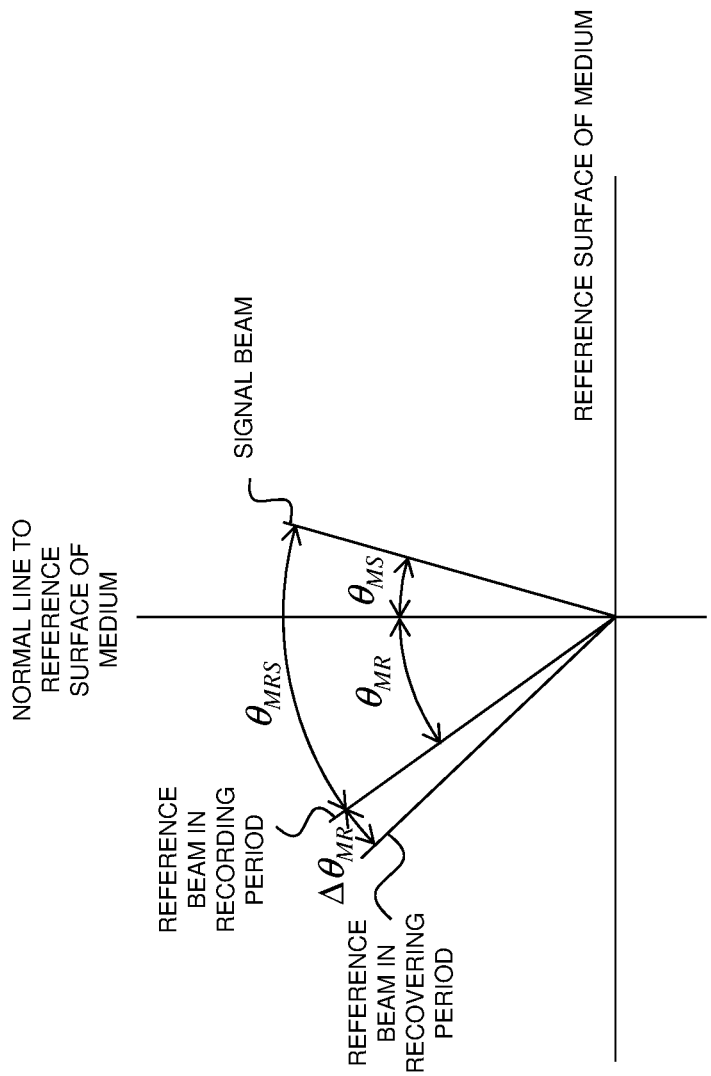
FIG. 5 is a side diagram illustrating definitions of angles of the signal beam and a reference beam in a medium.

FIG. 5 is a diagram illustrating definitions of the angles with respect to the signal beam and the reference beam in the medium. $\theta_{MR}$ is the angle of the reference beam 307 in the recording period with respect to the normal line of the optical information recording medium 1, and FIG. 5 illustrates a relationship among $\theta_{MRS}$, $\theta_{MS}$, and $\theta_{MR}$ with respect to the optical information recording medium 1. The angles in the air corresponding to $\theta_{MRS}$, $\theta_{MS}$, $\theta_{MR}$, and $\Delta\theta_{MR}$ are $\theta_{ARS}$, $\theta_{AS}$, $\theta_{AR}$, and $\Delta\theta_{AR}$, respectively. The signal beam is a light flux being incident on the optical information recording medium, and the angle of the signal beam illustrated in FIG. 5 is an example of an angle of the light flux. The range of the light flux used as the signal beam is, for example, an angle range of −20 deg to 60 deg.

Figure 6:
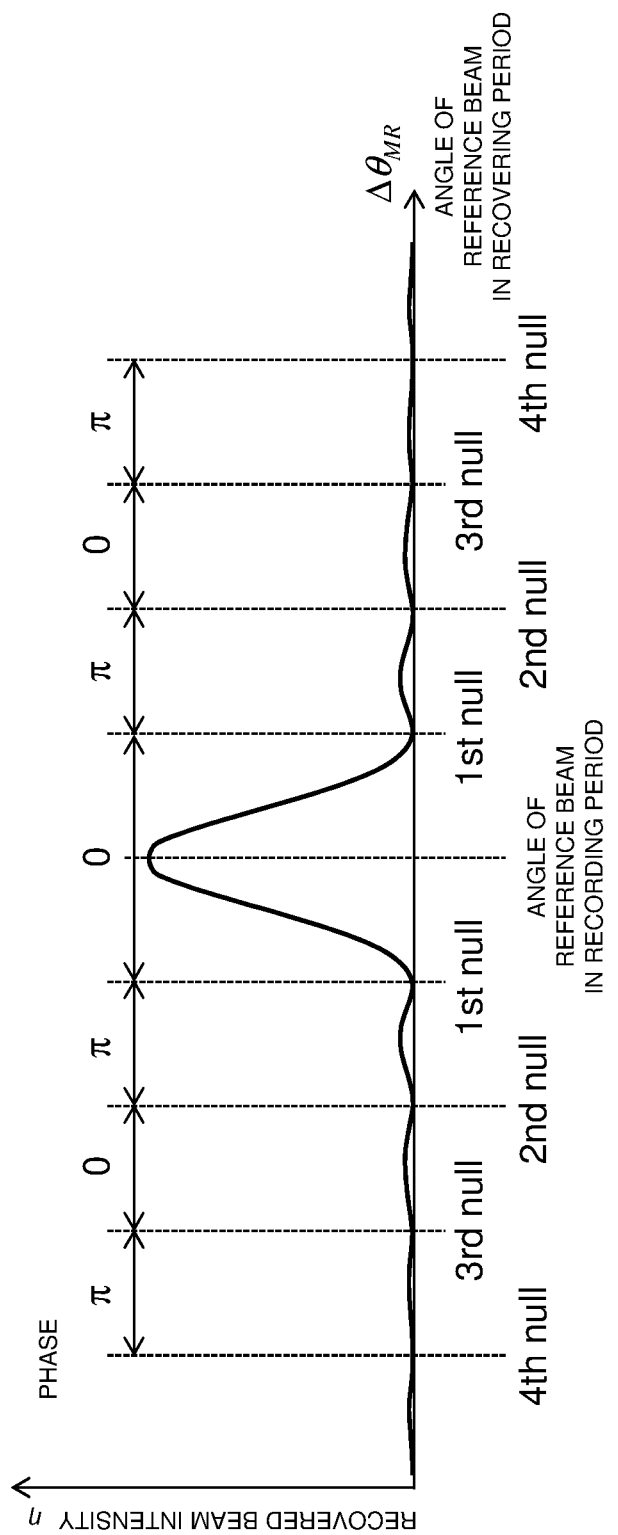
FIG. 6 is a schematic graph illustrating a recovered beam intensity and a phase with respect to a reference beam angle in a recovering period.

FIG. 6 illustrates the intensity η and phase of the recovered beam with respect to the reference beam angle $\theta_{MR}$ in the recording period. The recovered beam intensity is decreased according to the angle shift $\Delta\theta_{MR}$ of the reference beam with respect to the reference beam in the recording period while the recovered beam intensity is oscillated according to Mathematical Formula 1. An angle where the recovered beam intensity is 0 is referred to as null, and such angles are referred to as 1st null, 2nd null, and 3rd null from the side closer to the reference beam angle in the recording period. With respect to the phase, as the phase recovered at the reference beam angle in the recording period is used as a reference, the phase is inverted between 0 and $\pi$ every null, so that the phase in the 1st null is 0, the phase in an interval from the 1st null to the 2nd null is $\pi$, and the phase in the interval from the 2nd null to the 3rd null is 0. Namely, if the angle in the recording period is defined as 0th null, the phase in an interval from the even-numbered null to the odd-numbered null is 0, and the phase in an interval from the odd-numbered null to the even-numbered null is $\pi$.

Next, the influence of the crosstalk from the adjacent page will be described.

Figure 7:
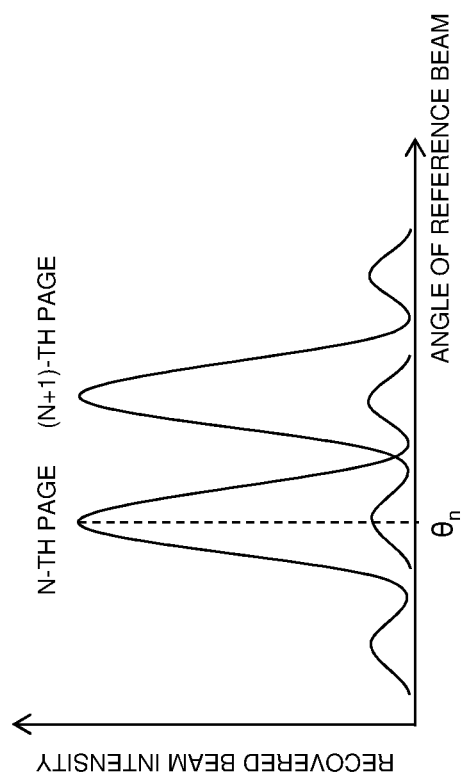
FIG. 7 is a schematic graph illustrating an example of inter-page crosstalk.

FIG. 7 is a schematic diagram illustrating an example of the crosstalk from the adjacent page. The crosstalk from the adjacent page is an unnecessary component leaked from other pages into the page data which are a recovering object. The horizontal axis denotes the reference beam angle, and the vertical axis denotes the recovered beam intensity. For example, in the case of recovering an n-th page by using an optimal reference beam angle $\theta_n$ for recovering, an (n+1)-th page which is an adjacent page is also recovered. In the example where two page data of the n-th page and the (n+1)-th page are recovered as illustrated, the total recovered beam intensity is expressed by Mathematical Formula 2.

$$I=|E_n|^2+|E_{n+1}|^2+2|E_n||E_{n+1}|\cos(\varphi_0+\Delta\varphi) \quad \text{[Mathematical Formula 2]}$$

Herein, I is an amount of the recovered beam at a reference beam angle $\theta_n$ $E_n$ is an amplitude of the recovered beam of the n-th page, $E_{n+1}$ is an amplitude of the recovered beam of the (n+1)-th page, $\varphi_0$ is a phase change with respect to the recording period of the recovered beam of the (n+1)-th page, and $\Delta\varphi$ is a phase difference in the recording period between the n-th page and the (n+1)-th page. Herein, if the case of recovering the data of the n-th page is considered, the first term $|E_n|^2$ is a desired recovered signal, and the second term $|E_{n+1}|^2$ is an unnecessary crosstalk component. In the example, since the recovering is performed at the reference beam angle $\theta_n$, there is a relationship of $|E_n|>>|E_{n+1}|$, and thus, the second term is much smaller than the first term.

The third term $2|E_n||E_{n+1}|\cos(\varphi_0+\Delta\varphi)$ may include a factor of $|E_n|$, and third term is a light amount which is relatively larger than the second term. Herein, as described above, $\varphi_0$ is null, and the phase is inverted between 0 and $\pi$. If the third term is adjusted to have a positive value, it is possible to improve signal quality by amplifying a desired recovered signal $|E_n|$. In principle, with respect to the phase difference $\Delta\varphi$ in the recording period between the pages, if it is defined that $\Delta\varphi=0$ at $\varphi_0=0$ and $\Delta\varphi=\pi$ at $\varphi_0=\pi$, cos $(\varphi_0+\Delta\varphi)$ in the third term becomes +1, so that it is possible to improve the signal quality by amplifying $|E_n|$.

In the case of considering the light amount of the crosstalk from the adjacent page, in Mathematical Formula 1, the angle shift $\Delta\theta_{MR}$ of the reference beam in the recovering period with respect to the reference beam in the recording period may be set to the angle interval between the adjacent pages.

Figure 8:
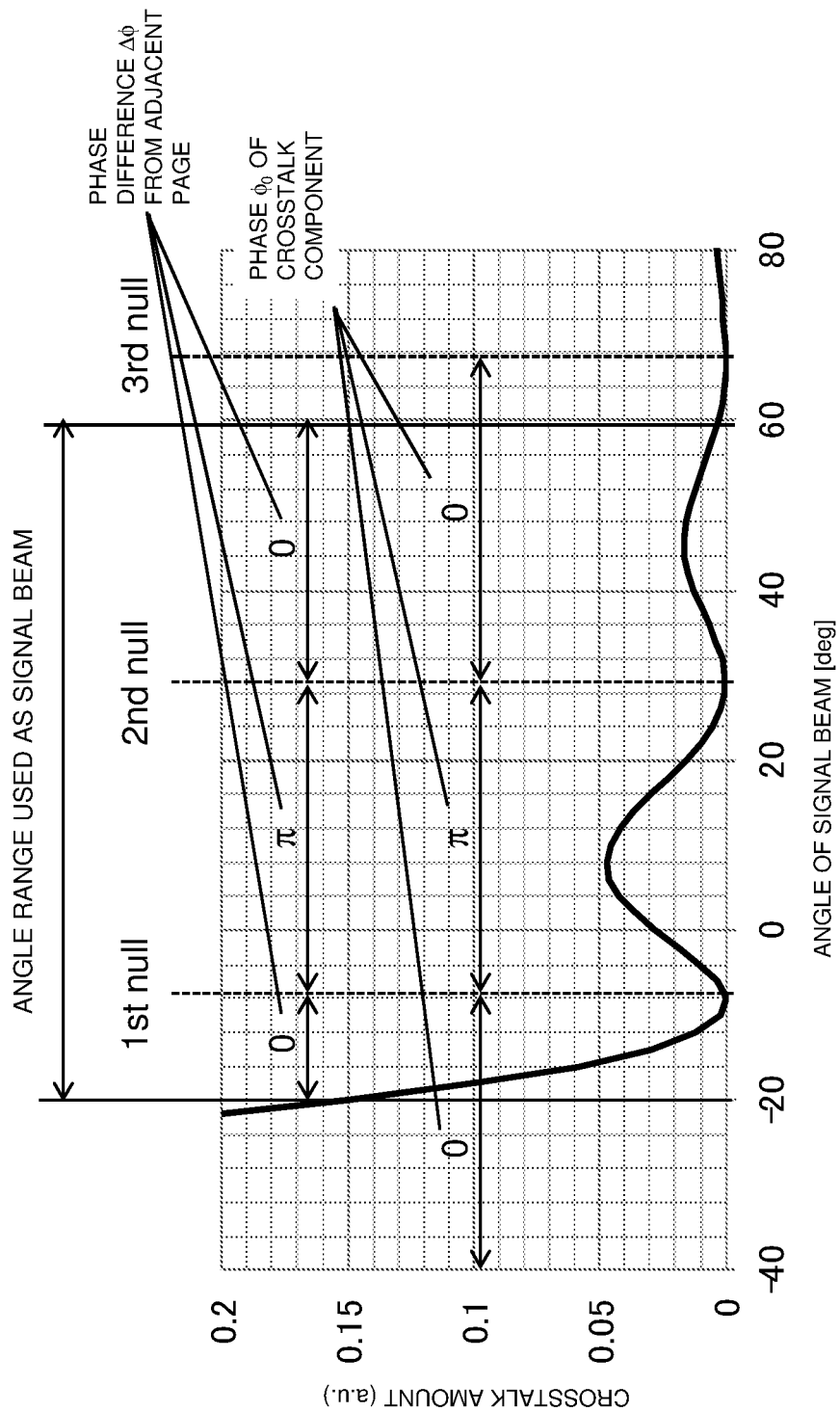
FIG. 8 is a graph illustrating a relationship between a signal beam angle and a crosstalk amount.

FIG. 8 illustrates that the amount of crosstalk from the adjacent page on the basis of Mathematical Formula 1 as the horizontal axis denotes the angle $\theta_{AS}$ of the signal beam 306 in the air. In the example of FIG. 8, the phase difference $\Delta\varphi_0$ of the crosstalk in the angle range used as the signal beam 306, namely, in the case where the angle of view of the light flux of the signal beam 306 is in a range of −20 deg to 60 deg and the phase difference $\Delta\varphi$ with respect to the adjacent page added to the signal beam 306 in order to reduce the crosstalk are illustrated. Herein, as an example, it is defined that n=1.5, L=1.5 [mm], $\lambda$=405 [nm], $\theta_{AR}$=45 [deg], and $\Delta\theta_{AR}$=50 [mdeg]. In the case where the angle range used as the signal beam 306 is in an interval from the 1st null to the 2nd null and an in an interval from −8 deg to 29 deg, it is known that the phase of the crosstalk from the adjacent page with respect to the recording period is $\pi$.

In the case where the angle range used as the signal beam 306 is in an interval from the 1st null to the 2nd null of the crosstalk component, the phase difference between the n-th page and the (n+1)-th page is $\varphi_0=\pi$, and the phase difference between the adjacent pages in the recording period is $\Delta\varphi=\pi$, so that the third term is positive. On the other hand, in the case where the angle range used as the signal beam 306 is inside the 1st null of the crosstalk component or outside the 3rd null, the phase difference between the n-th page and the (n+1)-th page is $\varphi_0=0$, and without the addition of the phase difference in the recording period, $\Delta\varphi=0$, so that the third term is maintained positive. More generally speaking, it is defined that the phase difference from the adjacent page in the recording period in an interval from an even-numbered null to an odd-numbered null is $\Delta\varphi=0$, and the phase difference from the adjacent page in the recording period in an interval from an odd-numbered null to an even-numbered null is $\Delta\varphi=\pi$. In order to increase the intensity of the recovered beam at all the signal beam angles, even in the case where the angle range of the signal beam 306 is large, it is possible to improve the signal quality.

Namely, in consideration of the crosstalk of the recovered signal from the adjacent page with respect to the recorded page, by controlling the phase of the signal beam in the recording period within the page, the quality of the recovered signal is improved.

Figure 9:
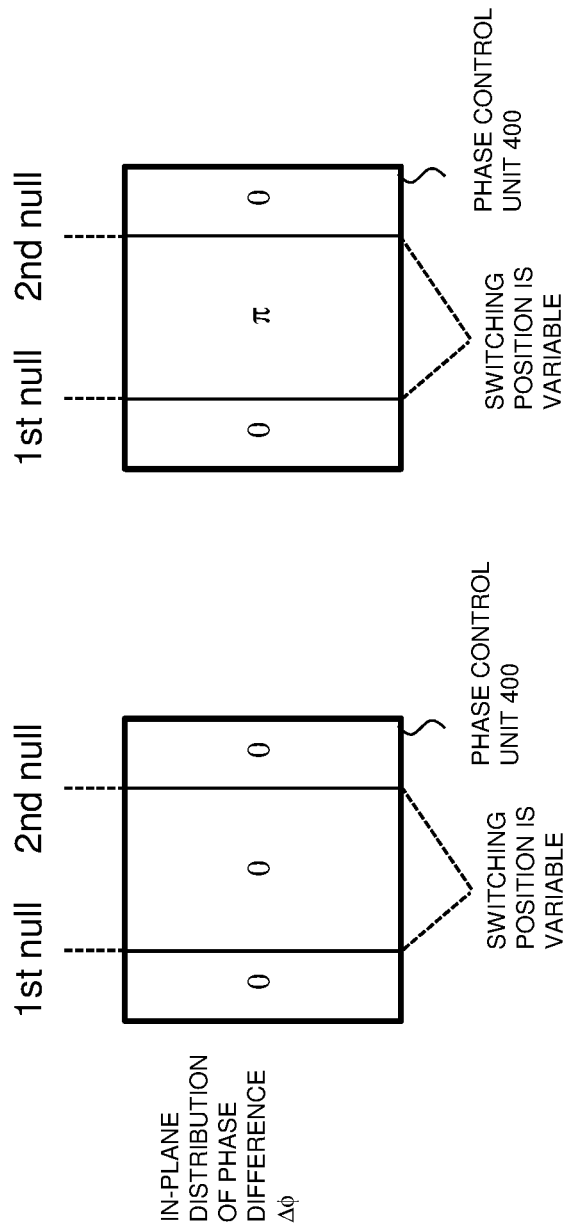
FIG. 9 is a schematic principle diagram illustrating an example of inter-page phase difference control.

FIG. 9 illustrates an example where different phase difference is given to each of the regions of the signal beam 306 with respect to the phase control element 400. As described above, the phase in the recording period is given so that the phase difference between the adjacent pages is set to $\pi$ in an interval between the odd-numbered null and the even-numbered null, and phase difference $\Delta\varphi$ is set to 0 in the other positions. Although the signal quality can be improved by reducing the crosstalk in this manner, since the null position is changed according to the angle of the reference beam 307 or the angle between the adjacent pages, the boundary between the phase differences needs to be configured to be variable, and thus, a degree of difficulty of manufacturing the phase control element 400 is increased.

Herein, it is illustrated that the null position is changed according to the angle of the reference beam 307.

Figure 10:
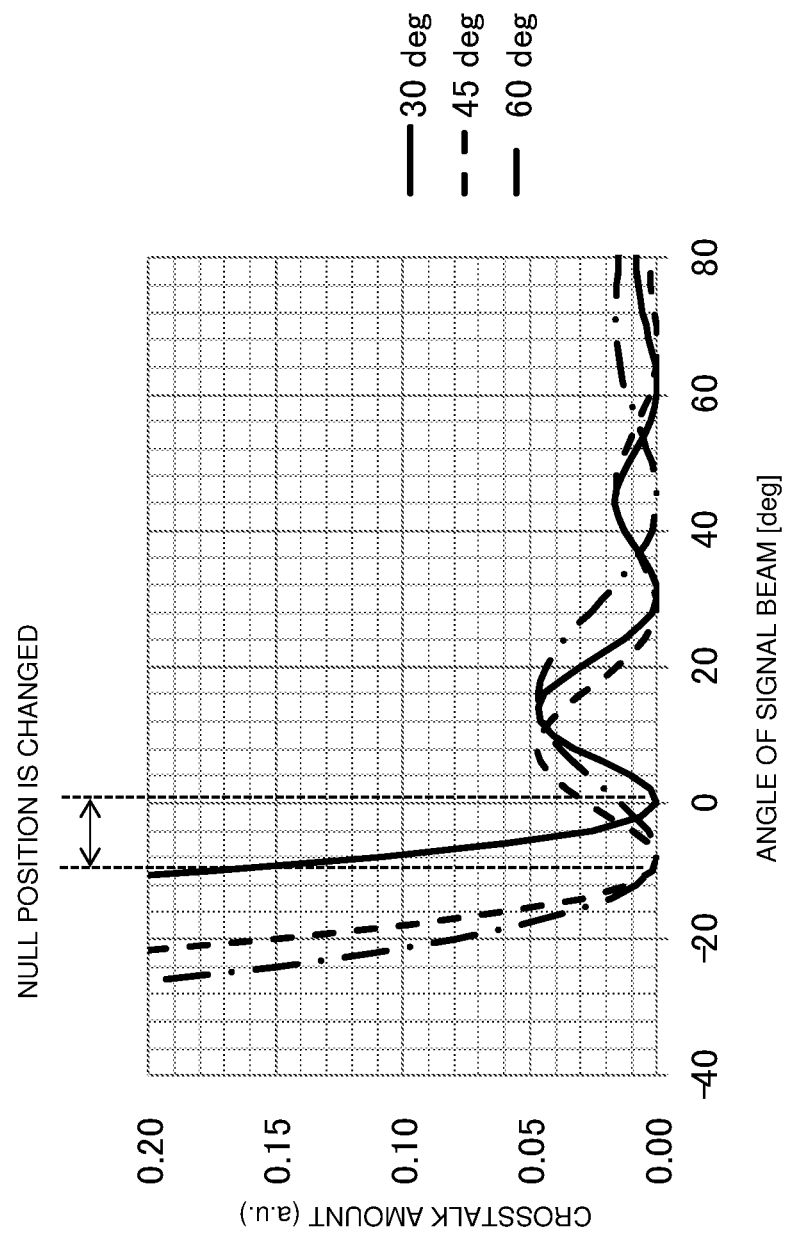
FIG. 10 is a graph illustrating reference beam angle dependency of a crosstalk amount.

FIG. 10 illustrates a crosstalk amount from the adjacent page in the case where an angle interval between the adjacent pages is fixed as $\Delta\theta_{AR}$=50 [mdeg]. In order to observe the dependency of the reference beam angle, calculation is performed in the cases where the reference beam angle $\theta_{AR}$ is 30 deg, 45 deg, and 60 deg. The other conditions are the same as those of FIG. 8. It can be understood from the figure that the null position is changed according to the reference beam angle. However, it is difficult to the control the boundary between the phase differences according to the reference beam angle by using the phase control element 400 of FIG. 9. Therefore, in comparison with the case where the angle interval between the pages is fixed, decreasing of the degree of difficulty of manufacturing the phase control element 400 by suppressing the change of the null position has been studied.

Next, a principle of fixing the boundary of the phase differences in order to decrease the degree of difficulty of manufacturing the phase control element 400 will be described. When the variable of the sine function in the right handed side of Mathematical Formula 1 is $\pi$, the 1st null is obtained. Therefore, by solving the formula with respect to the angle shift $\Delta\theta_{MR}$ of the reference beam in the recovering period with respect to the reference beam in the recording period, Mathematical Formula 3 is obtained.

$$\Delta\theta_{MR} = \frac{\lambda\cos\theta_{MS0}}{nL\sin\theta_{MRS0}} \qquad \text{[Mathematical Formula 3]}$$

Herein, $\theta_{MS0}$ is a signal beam angle of fixing the null position illustrated in the air, and $\theta_{MRS0}$ is a difference between the signal beam angle of fixing the null position and the reference beam angle illustrated in the air.

Figure 11:
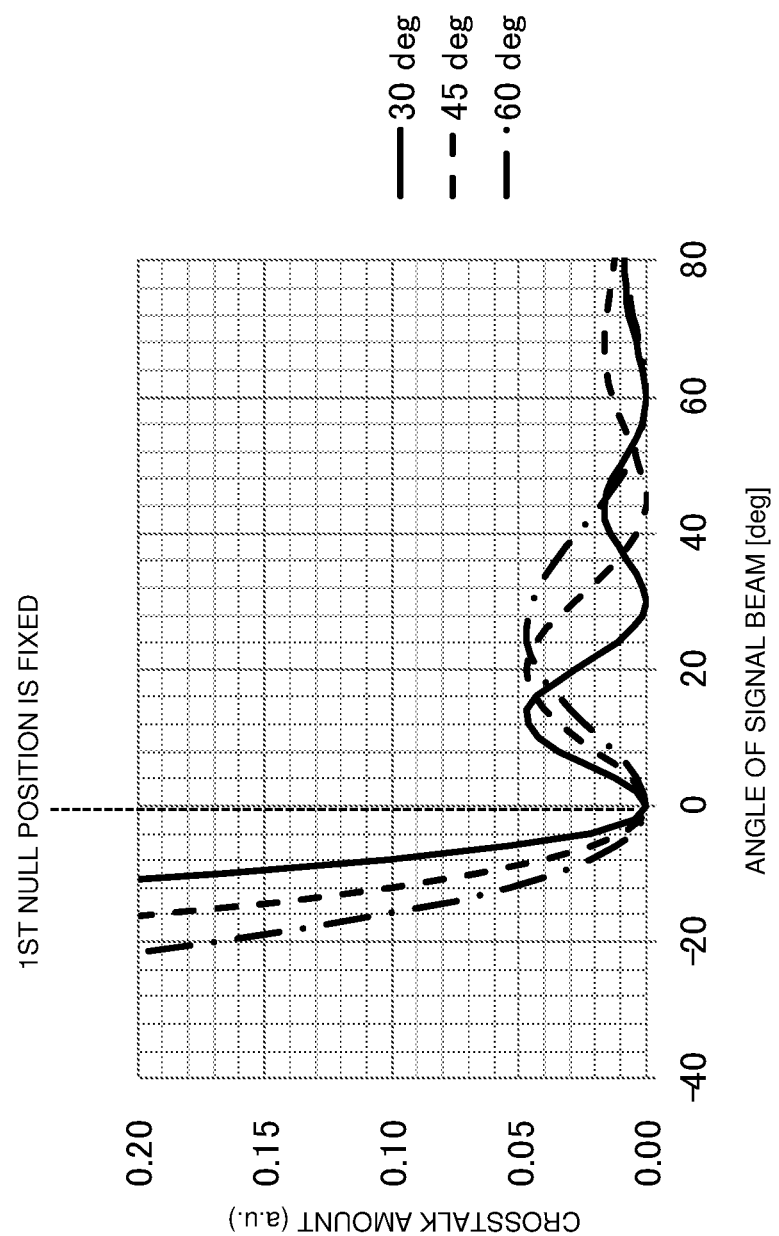
FIG. 11 is a graph illustrating reference beam angle dependency of a crosstalk amount.

FIG. 11 illustrates the dependency of the reference beam angle with respect to the crosstalk amount from the adjacent page, as an example, in the case of $\theta_{MRS0}=0$ [deg]. Similarly to FIG. 10, calculation is performed in the cases where the reference beam angle $\theta_{AR}$ is 30 deg, 45 deg, and 60 deg. The other conditions are the same as those of FIG. 8. It can be understood from the figure that, although the reference beam angle is changed, the position of the 1st null is fixed.

Figure 12:
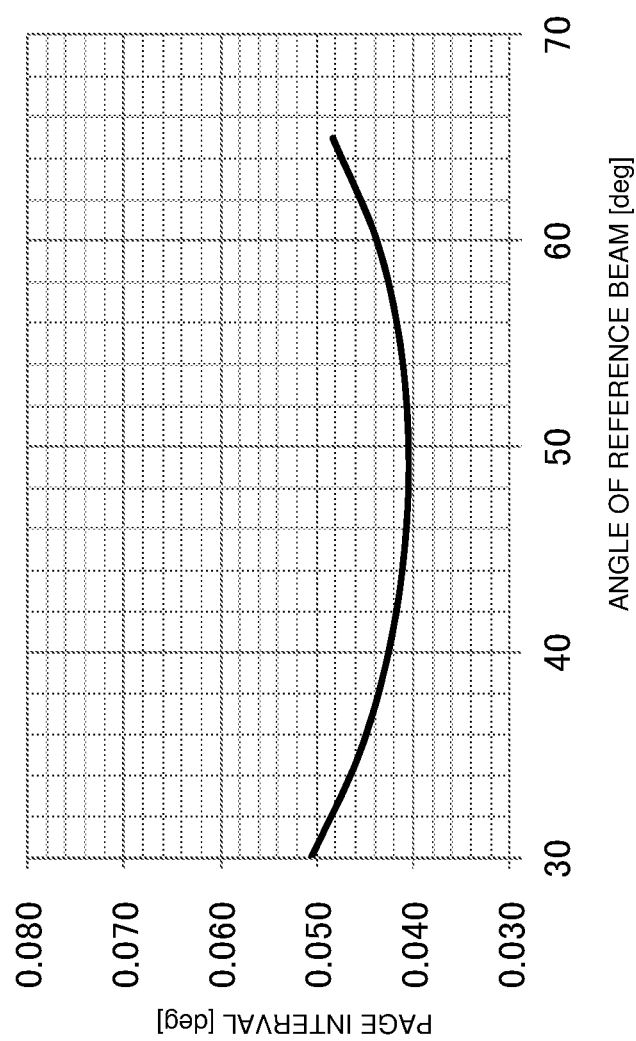
FIG. 12 is a graph illustrating a page interval with respect to a reference beam angle.

FIG. 12 illustrates a page interval with respect to the reference beam angle, as an example, in the case where the angle control for the page interval is performed by using Mathematical Formula 3 under the conditions of FIG. 11. The horizontal axis denotes the reference beam angle, and the vertical axis denotes the angle of the page interval. AS illustrated in FIG. 12, in the example, the graph is a concave-shaped graph where large values are given to both ends and a small value is given to a middle portion. Namely, for example, the amount of angle change of the galvano-mirror changing the reference beam angle between the pages is set to be gradually decreased from one end of the movable range, and on the contrary, if the angle becomes a predetermined reference beam angle, the amount of angle change is set to be gradually increased. By such control of the page interval, the movement of the position of the 1st null can be suppressed. The amount of angle change may be calculated and stored in a memory or the like in advance and may be used for controlling the driving of the galvano-mirror 319.

FIG. 1 illustrates an example where different phase difference is given to each of the region of the signal beam 306 with respect to the phase control element 400 in the case where the position of the 1st null is fixed. By setting the phase difference $\Delta\varphi$ between the adjacent pages to 0 in an interval from the 0th null to the 1st null and setting phase difference $\Delta\varphi$ to $\pi$ in the other positions, it is possible to obtain the effect of reducing the crosstalk from the adjacent page in an interval from the 0th null to the 2nd null. Since the positions after the 2nd null are changed according to the reference beam angle, the effect of reducing the crosstalk cannot be obtained. However, since the influence of the crosstalk from the adjacent page is more dominant in the 2nd null than in the 0th null, the influence is small.

Figure 13:
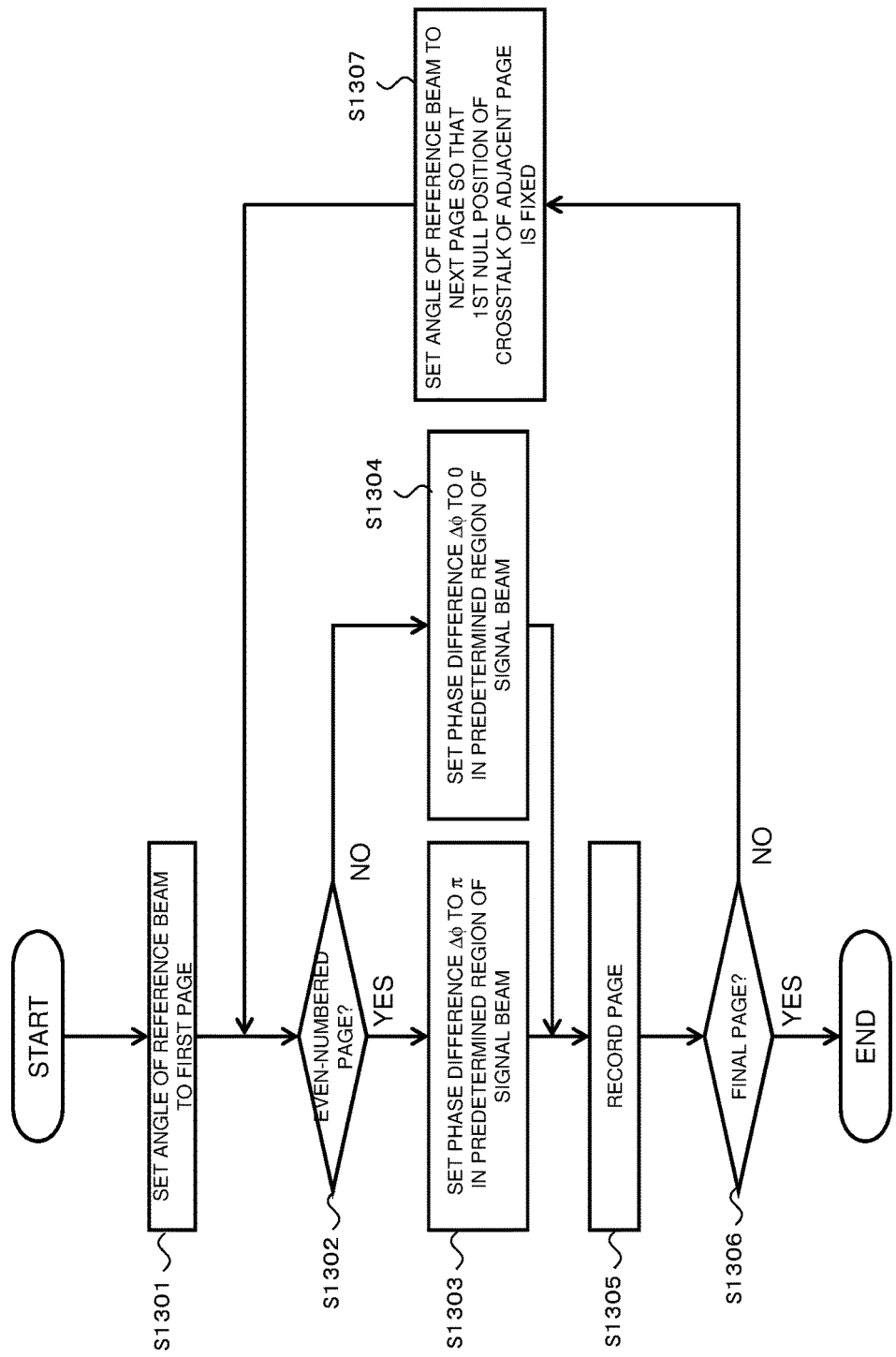
FIG. 13 is a flowchart illustrating an example of an operation flow of the optical information recording/recovering device.

FIG. 13 illustrates an embodiment of an operation flow within a book of the optical information recording/recovering device 10. First, in S1301, an angle of a reference beam 307 is set to a first page. In S1302, it is determined whether the set page is an even-numbered page. If the page is an even-numbered page, in S1303, a phase difference $\Delta\varphi$ is configured to be $\pi$ in a predetermined region of the signal beam 306 by the phase control element 400. If the page is not an even-numbered page, in S1304, the phase difference $\Delta\varphi$ is configured to be 0 in a predetermined region of the signal beam 306 by the phase control element 400. In S1305, recording of page data is performed, and in S1306, it is determined whether the page is a final page. If the page is a final page, book recording is ended. If the page is not a final page, in S1307, the reference beam angle in the next page is set so that the position of the 1st null of the crosstalk from the adjacent page is fixed, and the process proceeds to S1302.

According to the embodiment, even in the case where the page interval is decreased, by controlling the page interval and the phase of the signal beam, it is possible to effectively reduce the crosstalk, and it is possible to implement high density.

In addition, since there is possibility that the same phase may not necessarily occurs in the 0th nulls but a phase difference may occur due to the influence of the phase mask between the adjacent pages or the influence of the shift or the like of the mirror shaft in the angle changing of the galvano-mirror 319, the phase difference $\Delta\varphi$ may be controlled after the phase difference is compensated for.

In addition, since the Bragg selectivity does not necessarily follow a theoretical value, in Mathematical Formula 3, the reference beam angle may be controlled appropriately by changing the thickness of the recording layer of the medium, multiplying with coefficients, or the like. In this case, the switching position of the phase control by the phase control element 400 may also be changed according to the Bragg selectivity.

Second Embodiment

A second embodiment of the present invention will be described. The configuration of the device and the operation flow can be implemented to be similar to those of the first embodiment, and thus, the description thereof is omitted.

In the second embodiment, the angle range used as the signal beam 306 is set to the region after the 1st null of the crosstalk. For example, in the condition of FIG. 11, the signal beam 306 is arranged in a range which is larger than 0 deg. In the case where the page interval is set from the angle range of the signal beam 306, by using an innermost angle of the signal beam 306, that is, a signal beam angle in the side closest to the reference beam 307 for Mathematical Formula 3, and thus, the angle interval of the reference beam 307 may be controlled.

Figure 14:
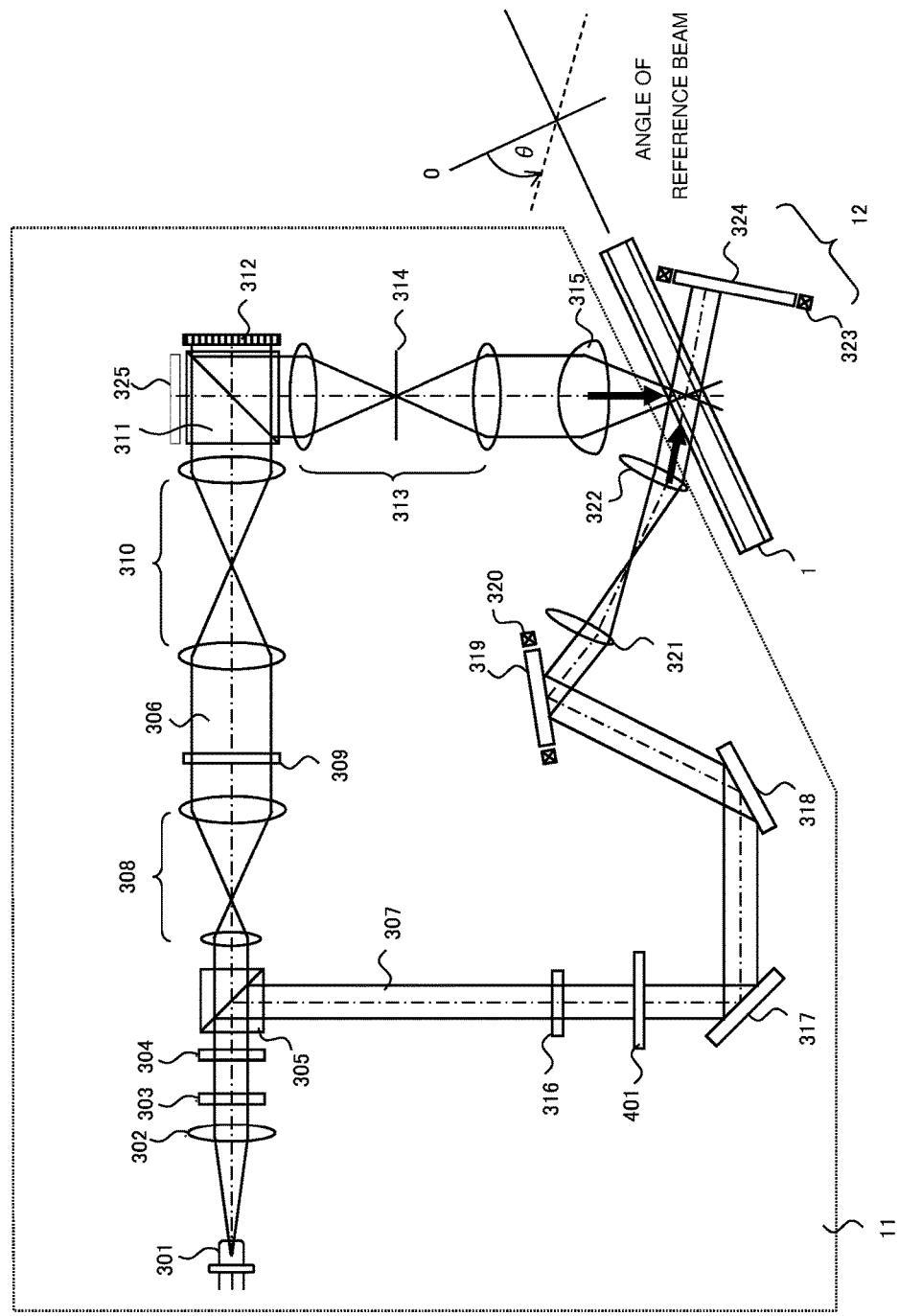
FIG. 14 is a schematic block diagram illustrating an embodiment of pickup in the optical information recording/recovering device.
Figure 15:
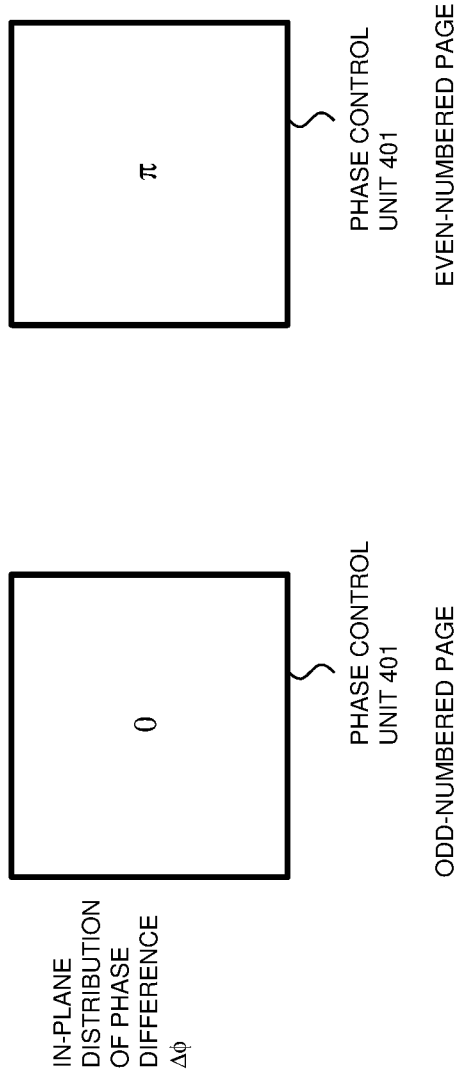
FIG. 15 is a principle diagram illustrating an example where a phase difference is applied to a reference beam.

FIG. 14 illustrates a schematic diagram illustrating an embodiment of a pickup in an optical information recording/recovering device. The figure is different from FIG. 2 in that, instead of the phase control element 400 on the signal beam optical path, a phase control element 401 is added on the reference beam optical path. In the embodiment, since the crosstalk in an interval from the 1st null to the 2nd null is dominant, the phase every region does not need to be controlled. Therefore, the phase difference $\pi$ may be given to the entire light flux of any one of the signal beam 306 or the reference beam 307 between the adjacent pages. FIG. 15 illustrates an example where the phase difference is given to the signal beam 306 with respect to the phase control element 401. The phase difference between the adjacent pages given to the entire light flux may be $\pi$.

In addition, if the angle interval of the reference beam 307 at an angle inner than the innermost angle is calculated, the phase difference of $\pi$ may be given to the entire light flux. Therefore, the innermost angle of the signal beam 306 does not need to be fixed at the time of calculating the angle interval, and the angle inner than the innermost angle may be used.

As described heretofore, in the second embodiment, an optical information recording/recovering method of recording and recovering interference pattern of a signal beam and a reference beam as a hologram on an optical information recording medium by using holography includes a step of controlling an angle interval so that, in an information recording period, a position of a 1st null of an adjacent page where recording is performed in an angular multiplexing method is at a side inner than an innermost angle of the signal beam and a step of control a phase of at least one of the signal beam and the reference beam in a recording period so that a phase difference between adjacent pages is a predetermined value.

In addition, the phase of at least one of the signal beam and the reference beam is controlled so that the phase difference of the signal beam between the adjacent pages is substantially $\pi$.

In the method according to the embodiment, there are advantages that it is possible to more easily manufacture the phase control element 401 and, since the phase of the reference beam 307 of which the light flux diameter is smaller than that of the signal beam 306 is controlled, a small-sized phase control element 401 can be used, so that it is possible to reduce the cost.

The present invention is disclosed by considering that the information of the signal beam 306 is given by using an amplitude. In the case where the information of the signal beam 306 is given by using a phase, it is difficult to control the phase difference between the pages in a data portion of the page data. However, even in the case where the information of the signal beam 306 is given by using the phase, the crosstalk amount is reduced by controlling the phase difference with respect to an existing pattern which is at a fixed position in the page data, so that it is possible to improve the signal quality of an existing pattern.

In addition, the present invention is not limited the above-described embodiments, but various modifications may be included. For example, the above-described embodiments are described in detail in order to allow the present invention to be easily understood, and thus, the present invention is not limited to necessarily include all the configurations described. In addition, a portion of configurations of an embodiment may be replaced with configurations of the other embodiment, and configurations of an embodiment may be combined with configurations of the other embodiment. In addition, with respect to a portion of configurations of each embodiment, other configurations may be added, removed, or replaced.

In addition, with respect to the above-described each configuration, function, processing unit, processing means, and the like, some or all thereof may be embodied in a hardware manner, for example, by designing integrated circuits, or the like. In addition, the above-described each configuration, function, and the like may be embodied in a software manner by allowing a processor to interpret a program embodying each function and to execute the program. Information such as the program embodying each function, tables, and files may be stored in a recording device such as a memory, a hard disk, and SSD (Solid State Drive) or on a recording medium such as an IC card, an SD card, and DVD.

In addition, control lines and information lines which are considered to be necessary for description are illustrated, and thus, all the control lines or information lines may not necessarily appear in a product. In an actual case, it may be considered that almost all configurations are connected to each other.

In addition, in the specification, the example of reducing the crosstalk between the adjacent recovered beams is described. However, the present invention is not limited to the adjacent page, but the present invention may be used for the purpose of reducing the crosstalk between the neighboring pages which are not adjacent to each other. In addition, the present invention may be used for the purpose of reducing the crosstalk between the adjacent books or between the neighboring books.

In addition, in the specification, the example in an angular multiplexing type hologram is disclosed, but the present invention may be used in other hologram multiplexing system such as a shift multiplexing type may be used.

In addition, although the example of changing the phase of the optical path of any one of the signal beam 306 and the reference beam 307 is illustrated, the present invention may be implemented by changing the phases of the both of the signal beam and the reference beam.

In addition, instead of configuring the phase difference between the neighboring signals over the entire pixels of the signal beams 306 to be substantially $\pi$, by using a portion of the pixels of the signal beam 306, the effect of reducing the crosstalk can be obtained. Therefore, the phase difference may be configured to be substantially $\pi$ by using only a portion of the signal beam, and even in the case where the phase difference is not substantially $\pi$, since there is the effect of reducing the crosstalk, the phase difference may be controlled so as to be a phase other than $\pi$.

REFERENCE SIGNS LIST

1: optical information recording medium
10: optical information recording/recovering device
11: pickup
12: recovering reference beam optical system
13: disc cure optical system
14: disc rotation angle detection optical system
81: access control circuit
82: light source driver circuit
83: servo signal generation circuit
84: servo control circuit
85: signal processing circuit
86: signal generation circuit
87: shutter control circuit
88: disc rotation motor control circuit
89: controller
90: input/output control circuit
91: external control device
100: phase difference control device
301: light source
302: collimation lens
303: shutter
304: ½ wave plate
305: PBS prism
306: signal beam
307: reference beam
308: beam expander
309: phase mask
310: relay lens
311: PBS prism
312: spatial light modulator
313: relay lens
314: spatial filter
315: objective lens
316: polarization direction changing element
317: mirror
318: mirror
319: mirror
320: actuator 321: lens
322: lens
323: actuator
324: mirror
325: photo detector
400: phase control element
401: phase control element
402: actuator

The invention claimed is:

1. An optical information recording device which multiplex-records a hologram corresponding to an angle of incidence of a reference beam as a page on an optical information recording medium at the time of recording an interference pattern of a signal beam and the reference beam as the hologram on the optical information recording medium, comprising:
   a light source configured to emit a laser beam;
   an optical element configured to divide the laser beam into the reference beam and the signal beam;
   an angle control unit configured to control the angle of incidence of the reference beam on the optical information recording medium in the recording period; and
   a phase control unit configured to control a phase of at least one of the signal beam and the reference beam in the recording period,
   wherein the angle control unit controls the angle of incidence so that a change of a position of a 1st null of a recovered signal, from adjacent pages with respect to the page where the signal beam is to be recorded, is suppressed, and
   wherein the phase control unit controls the phase of at least one of the signal beam and the reference beam so that a phase difference between the adjacent pages is a predetermined value.

2. The optical information recording device according to claim 1, wherein the phase control unit controls the phase of the signal beam so that the phase difference between the adjacent pages is substantially $\pi$ in a region of the signal beam corresponding to a region larger than the 1st null in the page where the signal beam is to be recorded.

3. The optical information recording device according to claim 1, wherein the phase control unit controls the phase of the signal beam so that the phase difference between the adjacent pages is substantially 0 in a region of the signal beam corresponding to a region of an interval from a 0th null to the 1st null in the page where the signal beam is to be recorded and so that the phase difference between the adjacent pages is substantially $\pi$ in the other regions.

4. The optical information recording device according to claim 1, wherein the angle control unit changes an interval of the angle of incidence between the adjacent pages so that the position of the 1st null of the recovered signal from the adjacent pages with respect to the page where the signal beam is to be recorded is fixed.

5. The optical information recording device according to claim 1, wherein the angle control unit suppresses the change of the position of the 1st null by allowing an interval of the angle of incidence between the adjacent pages to be gradually decreased from one end of a variable region of the angle of incidence of the reference beam and allowing the interval of the angle of incidence between the adjacent pages to be gradually increased if the angle of incidence is a predetermined angle of incidence.

6. An optical information recording device which multiplex-records a hologram corresponding to an angle of incidence of a reference beam as a page on an optical information recording medium at the time of recording an interference pattern of a signal beam and the reference beam as the hologram on the optical information recording medium, comprising:
   a light source configured to emit a laser beam;
   an optical element configured to divide the laser beam into the reference beam and the signal beam;
   an angle control unit configured to control the angle of incidence of the reference beam on the optical information recording medium in the recording period; and
   a phase control unit configured to control a phase of at least one of the signal beam and the reference beam in the recording period,
   wherein the angle control unit controls the angle of incidence so that a position of a 1st null of a recovered signal from adjacent pages, with respect to the page where the signal beam is to be recorded, is outside a range of the page where the signal beam is to be recorded, and
   wherein the phase control unit controls the phase of at least one of the signal beam and the reference beam so that a phase difference between the adjacent pages is a predetermined value.

7. The optical information recording device according to claim 6, wherein the phase control unit controls the phase of at least one of the signal beam and the reference beam so that the phase difference between the adjacent pages is substantially $\pi$.

8. The optical information recording device according to claim 6, wherein the phase control unit gives the phase difference to an entire light flux of the reference beam so that the phase difference between the adjacent pages is substantially $\pi$.

9. An optical information recording method of recording an interference pattern of a signal beam and a reference beam as a hologram on an optical information recording medium, at the time of recording a plurality of pages in an angular multiplexing scheme, comprising:
   controlling an angle interval between the pages so that, with respect to each of the pages, a change of a position of a 1st null of crosstalk from an adjacent page is decreased; and
   controlling a phase of at least one of the signal beam and the reference beam so that a phase difference between each page and the adjacent page is a predetermined value.

10. The optical information recording method according to claim 9, wherein, in the controlling of the phase, the phase of the signal beam is controlled so that the phase difference between the each page and the adjacent page is substantially $\pi$ in a region larger than the 1st null of the crosstalk from the adjacent page.

11. The optical information recording method according to claim 9, wherein, in the controlling of the phase, the phase of the signal beam is controlled so that the phase difference between the each page and the adjacent page is substantially 0 in a region of an interval from a 0th null to the 1st null of the crosstalk from the each page and the adjacent page and so that the phase difference between the each page and the adjacent page is substantially $\pi$ in the other regions.

12. The optical information recording method according to claim 9, wherein, in the controlling of the phase,
   a boundary according to the position of the 1st null of the crosstalk from the each page and the adjacent page with respect to the page where the signal beam is to be recorded is set with respect to a light flux of the signal beam, and the phase of the signal beam is controlled so that the phase difference between the each page and the adjacent page is substantially 0 in a first portion interposing the boundary and so that the phase difference between the each page and the adjacent page is substantially $\pi$ in a second portion.

13. The optical information recording method according to claim 9, wherein, in the controlling of the angle interval, the angle interval between the pages is controlled so that the position of the 1st null in each of the pages is constant.

14. The optical information recording method according to claim 9, wherein, in the controlling of the angle interval, an angle of the reference beam incident on the optical information recording medium is changed at irregular intervals between the pages.

15. The optical information recording method according to claim 9, wherein, in the controlling of the angle interval, the position of the 1st null is controlled to be constant by allowing an interval of the angle of incidence of the reference beam between the each page and the adjacent page to be gradually decreased from one end of a variable region of the angle of incidence of the reference beam and allowing the interval of the angle of incidence of the reference beam between the each page and the adjacent page to be gradually increased if the angle of incidence is a predetermined angle of incidence.

* * * * *